United States Patent [19]
Johnson

[11] Patent Number: 6,023,667
[45] Date of Patent: Feb. 8, 2000

[54] OIL BURNER MOTOR AND REFRIGERATION AND AIR CONDITIONING MOTOR DIAGNOSTIC APPARATUS

[76] Inventor: Edward Johnson, P.O. Box 387, Clifton Park, N.Y. 12065

[21] Appl. No.: 09/041,478

[22] Filed: Mar. 12, 1998

[51] Int. Cl.$^7$ .............................. G06F 11/30; G21C 17/00
[52] U.S. Cl. ...................... 702/183; 73/305; 324/207.15; 701/104
[58] Field of Search .......................... 702/183; 324/204, 324/200, 207.11, 207.15; 73/290, 291, 304, 305; 431/12, 13; 123/495, 510, 1 A; 701/99, 104

[56] References Cited

U.S. PATENT DOCUMENTS

| | | | |
|---|---|---|---|
| 4,412,292 | 10/1983 | Sedam et al. | 362/479 |
| 4,712,648 | 12/1987 | Mattes et al. | 184/6.4 |
| 4,831,836 | 5/1989 | Matsuoka | 62/209 |
| 4,845,486 | 7/1989 | Knight et al. | 340/618 |
| 4,990,057 | 2/1991 | Rollins | 417/12 |
| 5,005,142 | 4/1991 | Lipchak et al. | 364/550 |
| 5,063,527 | 11/1991 | Price et al. | 364/550 |
| 5,402,110 | 3/1995 | Oliver et al. | 340/605 |
| 5,515,297 | 5/1996 | Bunting | 364/551.01 |
| 5,619,560 | 4/1997 | Shea | 379/106 |

*Primary Examiner*—Marc S. Hoff
*Assistant Examiner*—Kendrick P. Patterson

[57] ABSTRACT

The present invention is an apparatus for monitoring the running time and cycle time of electric motors. The apparatus diagnoses fuel consumption and burner functionality in heating plants by measuring elapsed motor running time. Alternatively, the apparatus diagnoses the running and cycle time of refrigeration and air conditioning motors for the purpose of measuring efficiency and predicting failures. The Apparatus has three major components: an inductive sensor device mechanically attached to the motor; a microprocessor device connected by cable to the inductive sensor device that records time and sensor device data and retransmits it; and the central monitoring device. The microprocessor device is connected by telephone to the central monitoring device. Using historical data of fuel deliveries and consumption and the sensor-supplied running time information, the central monitoring device will predict when the fuel tank needs refilling. The data can be used to indicate a failure has occurred. In addition, the central monitoring device is able to monitor a plurality of sensor devices. This data can be used by a fuel company to schedule and optimize fuel deliveries. When used in refrigeration and air conditioning applications, the apparatus monitors the time the compressor motor is running and the time it is idle. This ratio provides the efficiency of the system and advance notice of potential failures and possible refrigerant loss.

11 Claims, 5 Drawing Sheets

OIL BURNER MOTOR AND REFRIGERATION AND AIR CONDITIONING MOTOR DIAGNOSTIC APPARATUS

FIELD OF THE INVENTION

The Invention relates to monitoring and diagnostic systems for devices run by electric motors used in the heating, refrigeration, and air conditioning industries.

DESCRIPTION OF THE RELATED ART

There is a need to monitor the operation of an oil burner and to keep track of the fuel consumed and the fuel remaining in the supply tank. In addition there is a need to monitor the cycle time of refrigeration compressors for operating efficiency.

Fuel oil used in heating plants for residences and buildings is generally stored in tanks located either-inside or outside the building above ground or underground. Each tank must be refilled periodically to ensure adequate supplies are available when needed. The decision to refill the tank is made by the fuel supplier based on historical usage and on recent weather conditions. This method is imprecise and can result in multiple small deliveries with resulting increased delivery costs. As an alternative, several devices are available to measure the amount of fuel remaining in the tank and manual or automatic reporting of the data to the fuel supplier. The fuel remaining in the tank is generally measured using devices attached to or installed within the tank.

A residential fuel oil tank level reporting device is disclosed in U.S. Pat. No. 5,619,560 issued to Shea on Apr. 6, 1997. The patent discloses a means to monitor the level of fuel in a fuel tank by replacing the normal "sight gage" with a "sight gage" with an internal magnetic sensor. The sensor is connected to a device that senses the relative position of the tank level as detected by the level of the gauge. This method requires direct connection to the tank and only transmits when the tank reaches predetermined set points. The set point is a manual adjustment on the site gauge and cannot be remotely changed. Installation on underground fuel tanks may require excavation required for the wiring.

U.S. Pat. No 5,515,297 issued to Bunting on May 7, 1996 discloses a monitoring system that provides for several sensor devices that are wired into the existing oil burner. The patent requires a technician install a recording device for the data. The data must then be collected at a future time. The measurements taken are based on historical data collected from the sensor device installed on the oil burner.

U.S. Pat. No. 5,063,527, issued to Price et al. on Nov. 5, 1991, discloses a monitoring system that compares the running condition of the burner as detected by electrically installed sensors and comparing the results to known standards. Price teaches the burner be shut down if the detected values are outside the allowed specifications. There is no reporting and no effort to record data in any fashion. Thus, fuel usage and burner failure cannot be reported to a remote location.

U.S. Pat No. 5,005,142, issued to Lipchak et al. on Apr. 2, 1991, discloses a sensor system which electrically connects sensors to an oil burner, compares the sensor readings to a set of known references and sounds a local alarm if there is a significant deviation. Lipchak does not teach the recording of fuel consumption data, nor does it teach reporting the failure of the burner to a remote location. There is no accumulation of long term burn information that can be used for fuel consumption.

U.S. Pat. No. 4,990,057, issued on Feb. 5, 1991 to Rollins, discloses a refrigeration controller system to control the operation of a refrigeration compressor based on changes in lubricating oil pressure, low motor current and interruption of power and to provide an appropriate alarm. The apparatus does not predict the operating condition of the refrigeration unit nor the potential for failure. Further it does not provide monitoring data to a central monitoring site to inform technicians of the operating status of the unit being monitored.

Matsuoka in U.S. Pat. No. 4,831,836 issued on May 23, 1989 discloses a frequency control apparatus for detecting primary current for a motor or to detect pressure in a compressor during refrigeration cycles. Monitoring data is compared to preset limits and the frequency of the current to the refrigeration motor is changed to cause changes in the refrigeration cycle. This apparatus controls motor speeds and does not monitor operating conditions nor predict unit failures for reporting to a central monitoring unit.

In U.S. Pat. No. 4,712,648 issued on Dec. 15, 1987, Mattes et al discloses a magnetic coil driver and sensor monitoring circuit for a refrigeration pressure transducer. The device requires an pressure transducer to be installed in the compressor and predicts only low pressure conditions or failure of the pump. The device does not monitor the operating conditions of the unit nor predict failures not provide monitoring information to a central monitoring unit.

It is common for fuel distributors to have several hundred customers and it is therefore desirable to have a monitoring device which predicts fuel requirements without the need to add monitoring devices to tanks not in readily accessible locations where it is would be necessary to excavate to install monitoring devices and to provide in-ground data transmission lines. Currently there is no monitoring device that provides data to the service technician about the condition of the fuel burner. Likewise there is no sensor device to provide data to predict the operating condition of refrigeration and compressor units and the potential for failure.

SUMMARY OF THE INVENTION

The present invention provides a device that senses the presence of an electrical field induced around an electrical motor or off burner ignition coil without requiring an electrical or mechanical connection to an oil burner or refrigeration unit.

The present invention further provides a device to record: 1) The current date and time, 2) The cumulative time the burner runs during a given time period, 3) Any occurrence of a run time that is shorter than or equal to the "lock out" time, 4) The time elapsed between the beginning of the current run and the end of the previous run, 5) The date and time to initiate a telephone call for reporting data, 6) The electronic serial number to distinguish it from the plurality of other devices calling in to a monitoring and diagnostic device, 7) The number of power failures that have occurred since the microprocessor device last reported in, 8) The ability to send all of this data with error correction, back to a remote monitoring and diagnostic device for analysis, and 9) The ability to receive update instructions, real time clock updates, and new call back instructions from the remote monitoring and diagnostic device and store all values collected and received from the remote central monitoring device in non-volatile memory.

Further, prior art does not provide real-time reporting of "lock out" conditions. A "lock out" occurs when the oil burner runs but no flame is produced. A safety device in the oil burner senses the lack of flame and "locks out" and shuts down the burner after a predefined period, typically 45 seconds. The burner will not attempt to restart until the "lock out" switch has been physically reset by either the service technician or the home owner. Once reset, it will try again to ignite, only to be shut down again in 45 seconds if it fails to ignite. The prior art teaches the way to monitor all the conditions that led up to the "lock out" but does not provide the ability to detect "lock out" without electrical connection to the burner. Further, they do not teach a way to report the "lock out" back in real time to allow the burner to be serviced, rather the events contributing to the "lock out" may be recorded and held in memory until the service technician comes to collect the data.

The present invention determines the "lock out" by monitoring and analyzing only time without electrical connection to the burner. Further it provides information on the length of time the burner motor or compressor motor runs, and then predicts future failures by measuring the total running time, the average cycle time and the past history of that burner. The present invention further provides a means to monitor fuel consumption of an oil burner, oil burner efficiency by comparing actual fuel consumption with theoretical consumption calculated based on actual burn time together with the published flow rate of the burner nozzle, and the means to detect "lock out" or failure mode by measuring a "short burn" equal to the "lock out" timer reference followed by a prolonged period of "no burn."

It is still another object of the invention to provide a monitoring and diagnostic device to receive and analyze the data from a plurality of remotely located sensor devices and microprocessor devices. The monitoring and diagnostic device will: 1) Answer incoming telephone calls from remote microprocessor devices, 2) Provide accurate date and time information to keep all microprocessor devices clocks updated, 3) Maintain a database of client information including fuel tank size, the average fuel consumption rate, fuel nozzle size, the customer information, how low to let the tank get before calling back, the date and time for the microprocessor device to call back in for routine data reading, and other relevant data, 4) Provide the calculations necessary to determine how much fuel has been used and how much remains, 5) Provide notification of "lock out" or out of fuel customers, 6) Provide a monitoring and diagnostic device consisting of an interface device and a computer with software to input data, record microprocessor device history, receive fuel delivery information, and to provide fuel delivery scheduling to maximize delivery to each customer without allowing customers to run out of fuel. Further the monitoring and diagnostic device will track, record and diagnose fuel tank levels, burner and fuel nozzle condition, "lock out" conditions, and other operating conditions for heating plants.

It is another object of the invention to provide an apparatus to track and record the duty cycles of refrigeration compressor motors for the purpose of assuring that they are running within acceptable and remotely re-programmable limits. When limits are exceeded, the microprocessor device reports back to a remotely located monitoring and diagnostic device and generates an alarm condition to an operator. The operator can then send a service technician or reset the microprocessor device to a higher fault tolerance level and wait to see if it again reports back. By analyzing the rate at which the cycle time worsens, a failure time can be predicted by the remotely located monitoring and diagnostic device. Only a mechanical connection to the refrigeration unit is required for the sensor device. No electrical connection between the sensor device and the refrigeration unit is required. The present invention further provides a means to monitor the cycle time of a refrigeration compressor motor to measure how long the compressor must run to maintain the same average temperature of a refrigeration unit. When the motor runs for longer periods than normal, a service call is indicated.

DETAILED DESCRIPTION OF THE PREFERRED EMBODIMENT

The invention is a motor monitoring and diagnostic apparatus having a sensor device mechanically attached to an oil burner motor. The sensor device is attached by a connecting cable to a microprocessor device. The microprocessor device stores data for further transmission by telephone to a remotely located monitoring and diagnostic device. The monitoring and diagnostic device comprises an interface device and a computer. The monitoring and diagnostic device maintains all data from a plurality of microprocessor devices and provides master clock information for periodic transmission to the microprocessor devices.

Referring now to the detailed drawings there is illustrated an apparatus in accordance with the present invention which demonstrates the preferred embodiment of the present invention, wherein like referenced numerals refer to like elements throughout the drawings.

The invention is a motor monitoring and diagnostic apparatus comprised of three devices designed to monitor the amount of time an oil burner or refrigeration motor runs without direct electrical connections to the unit, to record the total running time, the average cycle time, to record short running times and to report these times back to a central monitoring and diagnostic device by telephone dial up circuitry. From the data received at the monitoring and diagnostic device, the user is provided with past fuel consumption, current fuel needs and indications of potential oil burner or refrigeration compressor failures or operation outside a desired profile. The apparatus is connected by mechanically attaching a sensor device to the motor on a compressor or an ignition coil or pump motor on an oil burner. The sensor device houses an inductive sensor to measure the AC field surrounding the motor or coil. The sensor device provides an output by cable to a microprocessor device. The microprocessor device is located nearby and is further connected to a source of AC current using a small wall transformer. A connection is made to the user's existing telephone line using an ordinary modular telephone jack. The monitoring and diagnostic device, located at a central site is connected to an ordinary telephone line from which it receives data from the microprocessor device, and comprises an interface device and a computer.

Figure 1:
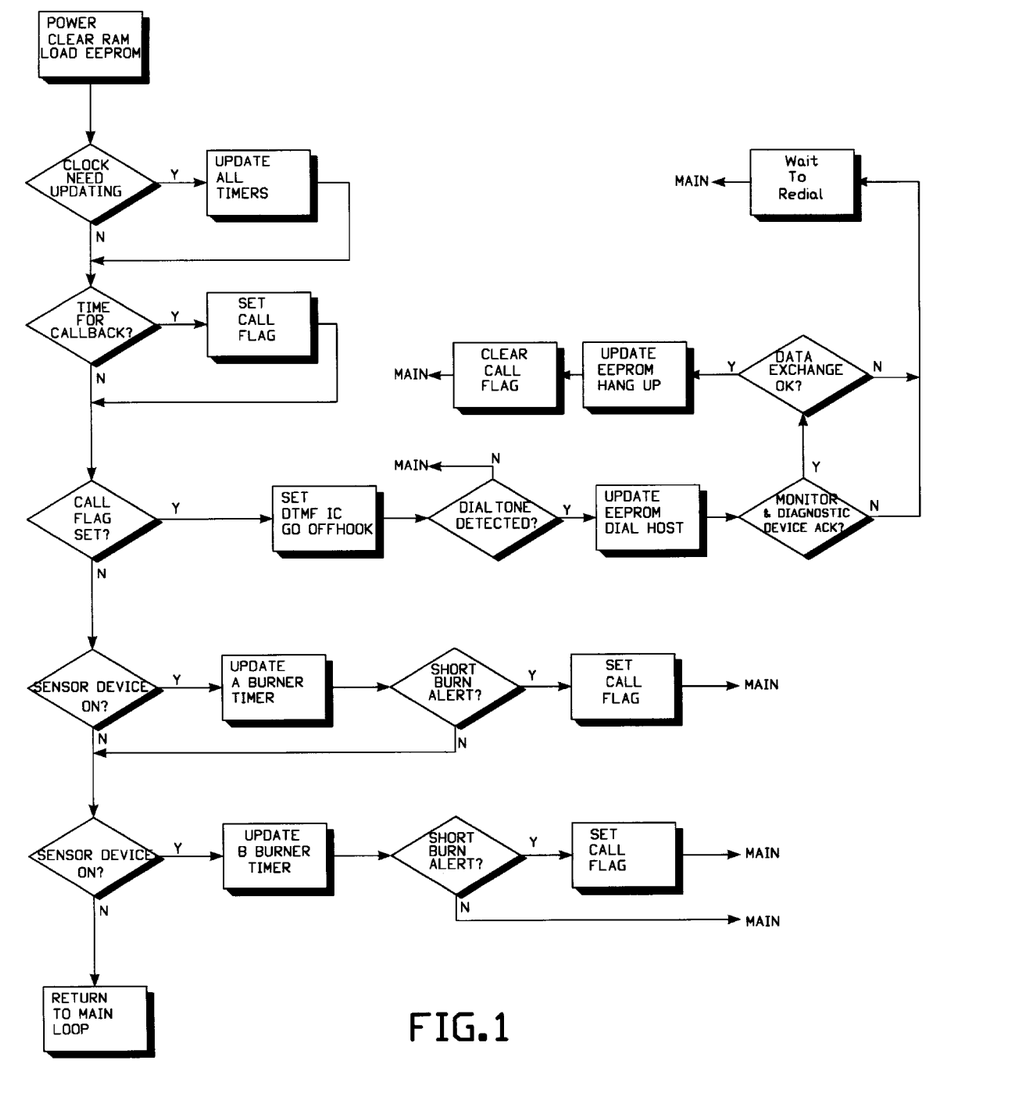
FIG. 1 is a flow diagram of the initialization sequence operation and the recording sequence operation of the present invention.

FIG. 1 is a flow diagram which depicts the embodiment of the initialization routine and the data recording routine of the microprocessor device.

Figure 2:
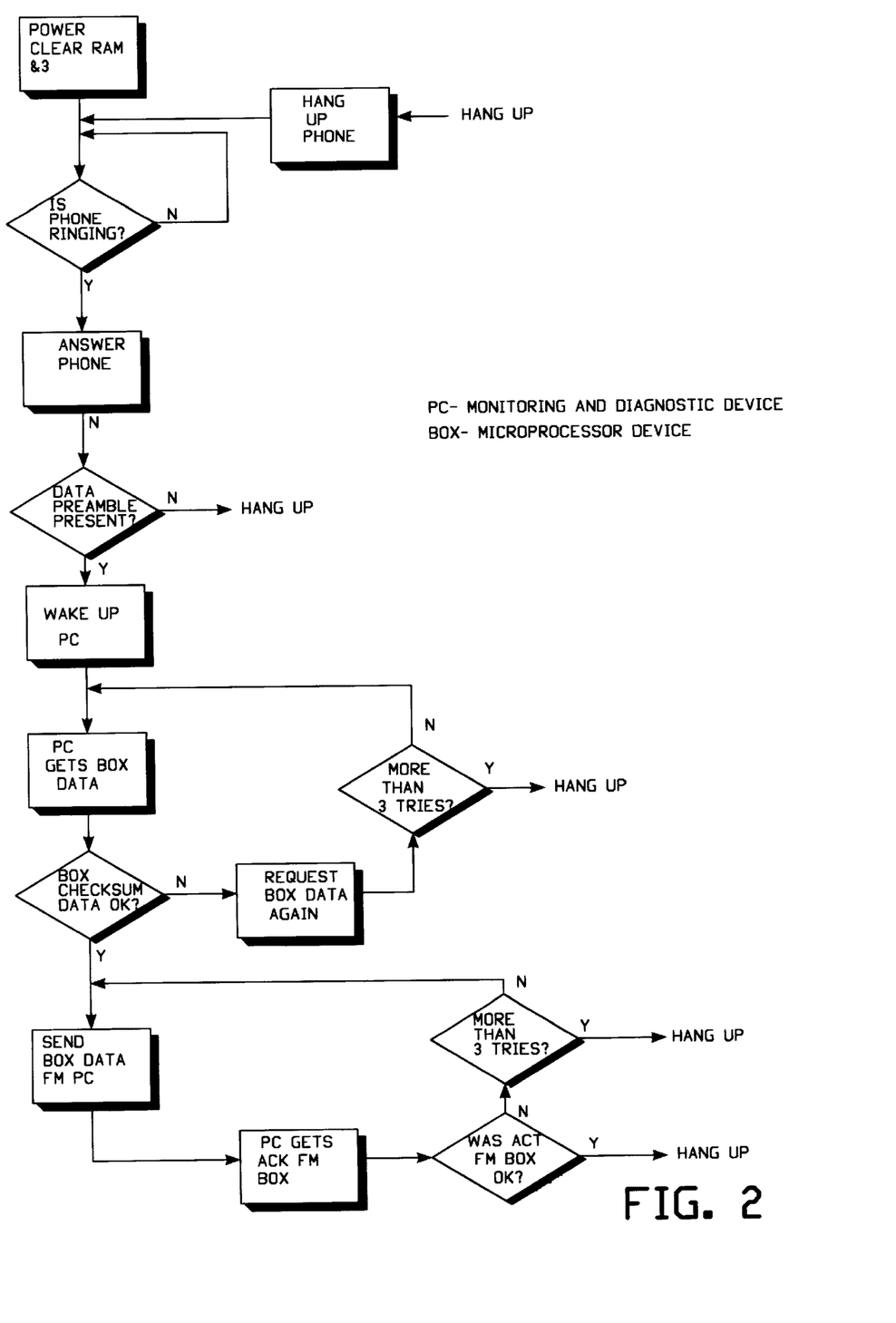
FIG. 2 is a flow diagram of the call answering and data transfer sequence by the monitoring and diagnostic device to respond to calls from the microprocessor device according to the present invention.

FIG. 2 is a flow diagram which depicts the call answer and the data transfer routine used by the central monitoring and diagnostic device in responding to the microprocessor device.

Figure 3:
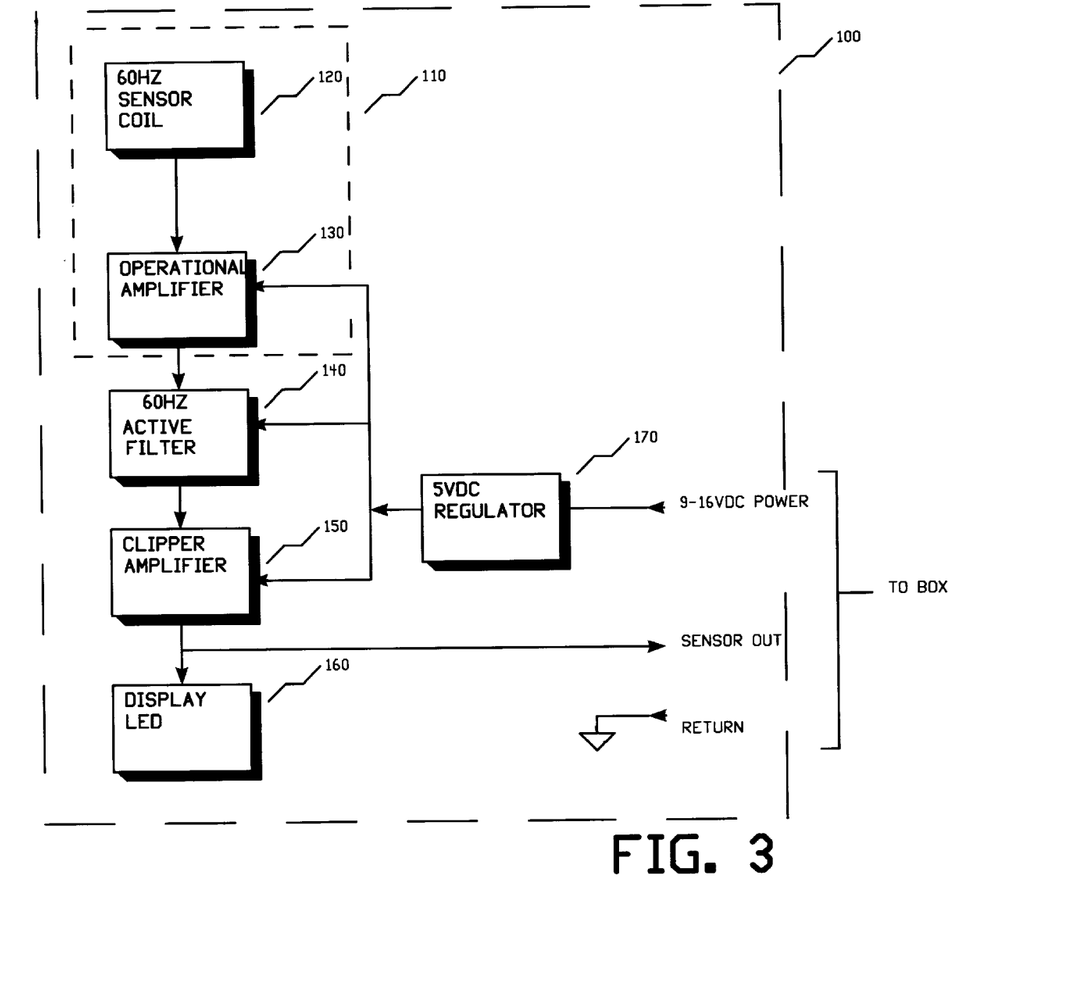
FIG. 3 is a block diagram of the motor sensor device in accordance with the present invention.

As shown on FIG. 3, sensor device 100 senses the strong electromagnetic field that surrounds motors and high voltage coils used in heating, air conditioning and refrigeration units. The sensor device 100 is comprised of a printed circuit board 110, an active filter 140, a clipper amplifier 150, a display LED 160 and a voltage regulator 170. Said printed circuit board 110 further comprises a sensor coil 120 and an operational amplifier 130. Said operational amplifier 130 further comprises a plurality of operational amplifiers. The sensor coil 120, provides a low voltage AC signal that is amplified, rectified, squared and integrated to a DC signal by said operational amplifier 130. The active filter 140 and clipper amplifier 150 provide filtering of the low voltage AC signal from said sensor coil 120 to reduce stray pick up and to eliminate any chance of local interference from strong RF fields that may be in close proximity. The sensor device 100 is connected to the microprocessor device by a connecting cable 190 that provides DC power, ground and an output signal path for the sensor device 100. Further the sensor device 100 contains a voltage regulator 170 to provide regulated DC voltage for stable operation of the sensor device 100. The DC power to run the sensor device 100 is supplied by the microprocessor device using said connecting cable 190. A switched DC signal is provided back to the microprocessor device from the sensor device whenever the 60 Hz detector senses the motor or ignition coil running. The display LED 160 is optionally installed in said sensor device 100 to provide a visual indication that the sensor device 100 detects a running motor or ignition coil.

Figure 4:
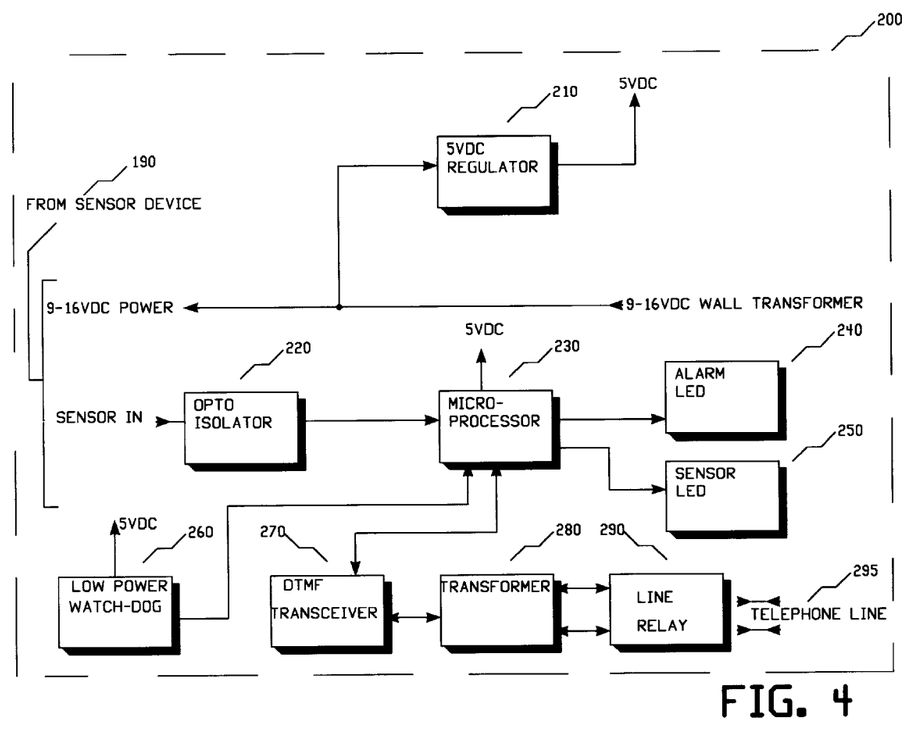
FIG. 4 is a block diagram of the microprocessor device in accordance with the present invention.

The microprocessor device 200, shown in FIG. 4, is located near the sensor device 100 and is connected to the sensor device 100 by the connecting cable 190. The connecting cable 190 carries DC power to operate said sensor device 100 circuitry, ground and the signal output to tell the microprocessor device 200 that the sensor device 100 detects the motor running. As further shown in FIG. 4, said microprocessor device 200 contains an opto isolator 220, a voltage regulator 210, a microprocessor circuit 230, a DTMF transceiver 270, a low power watchdog circuit 260, an isolation transformer 280 for connection to the phone line, an alarm LED 240, a sensor LED 250 and a line relay 290. The microprocessor device 200 is powered by an AC to low voltage DC wall transformer which supplies power to both the microprocessor device 200 and the sensor device 100. The microprocessor device is connected to the user's telephone line 295. Said volt regulator 210 is provided to deliver regulated DC voltage to said microprocessor device 200 components. Said microprocessor circuit 230 controls and monitors all functions within the microprocessor device 200 and further provides a means to transmit data back to a central monitoring and diagnostic computer. The microprocessor circuit 230 contains an internal EEPROM that holds the collected data, serial number and other needed data in non-volatile memory. To support the microprocessor circuit 230 is said low power watchdog circuit 260 that allows the microprocessor circuit 230 to reset when there is a brown out or power failure. The watchdog circuit 260 also provides a clean power up start condition for the microprocessor device 200. The user's telephone line is connected to the microprocessor device via a standard modular type phone plug. The microprocessor device 200 will electrically appear as an ordinary telephone extension. In normal operation, the microprocessor circuit 230 generates a clock signal every second and updates the calendar/clock for the microprocessor device 200. As the current time is updated, it is compared to the "call back time" last received from the monitoring and diagnostic computer. The microprocessor circuit 230 constantly scans two inputs which are coupled to the microprocessor circuit 230 by said opto isolator 220 to protect the microprocessor circuit 230 from extraneous spikes that may be picked up on the connecting cable 190 from the sensor device 100. The opto isolator 220 further insures a modest amount of current must flow from the sensor device 100 for it to be considered a "real" signal. Said opto isolator 220 contains a plurality of optical couplers. If said opto isolator 220 detects a signal the microprocessor circuit 230 records the entire time the motor is running and adds this to elapsed time storage registers in the memory. Periodically and just before data is reported back to the central monitoring and diagnostic computer, the elapsed time storage registers are save to the EEPROM. In addition, the time between runs is also measured and stored in a similar fashion. The sensor LED 240 is optionally installed in said microprocessor device 200 to provide a visual indication that the sensor device 100 detects a running motor or ignition coil. By knowing the real time elapsed and the time the sensor device is on, the duty cycle can be calculated. The microprocessor device is programmed to report conditions where the sensor device being monitored, turns on and then off in a relatively short period. This condition in an oil burner could be considered a "lock out" condition. The alarm LED 240 is optionally installed in said microprocessor device 200 to provide a visual indication that the sensor device 100 detects a "lock out" condition. The microprocessor device compares each and every run time with a "short run" value loaded from the monitoring and diagnostic computer. If the run time is less than the "short run" value, an alarm flag is set in the microprocessor device. The microprocessor device is constantly scanning it's internal registers looking for alarm flags. If said microprocessor device sees an alarm flag, or if said microprocessor device determines that it is time to call the monitoring and diagnostic computer, said microprocessor device will close said line relay to connect the microprocessor device 200 to the telephone line. Said microprocessor device will determine if a dial tone is present on the telephone line 295. If a dial tone is not present, it will hang up and try again later. This prevents the microprocessor device from inadvertently trying to send data on top of a telephone conversation already in progress. The DTWF transceiver 270 takes audio from the phone line, amplifies it and squares it off to produce pulses that are, in turn fed to the microprocessor circuit 230, counted and compared to stored values. If the values indicate a dial tone, the microprocessor device proceeds to dial the monitoring and diagnostic device. The data is then passed to the interface device and then to the computer which comprise the monitoring and diagnostic device and new data is passed back from the monitoring and diagnostic device to the microprocessor device. This new data consists of a new time to call back, an update to the calendar/clock in the microprocessor device from the master clock/calendar in the monitoring and diagnostic device and any other updates that the monitoring and diagnostic device deems necessary. If the data is exchanged successfully, the timers in the microprocessor device are then reset to zero to begin the next period. The program code for the microprocessor device is contained within the internal memory of the microprocessor circuit.

Figure 5:
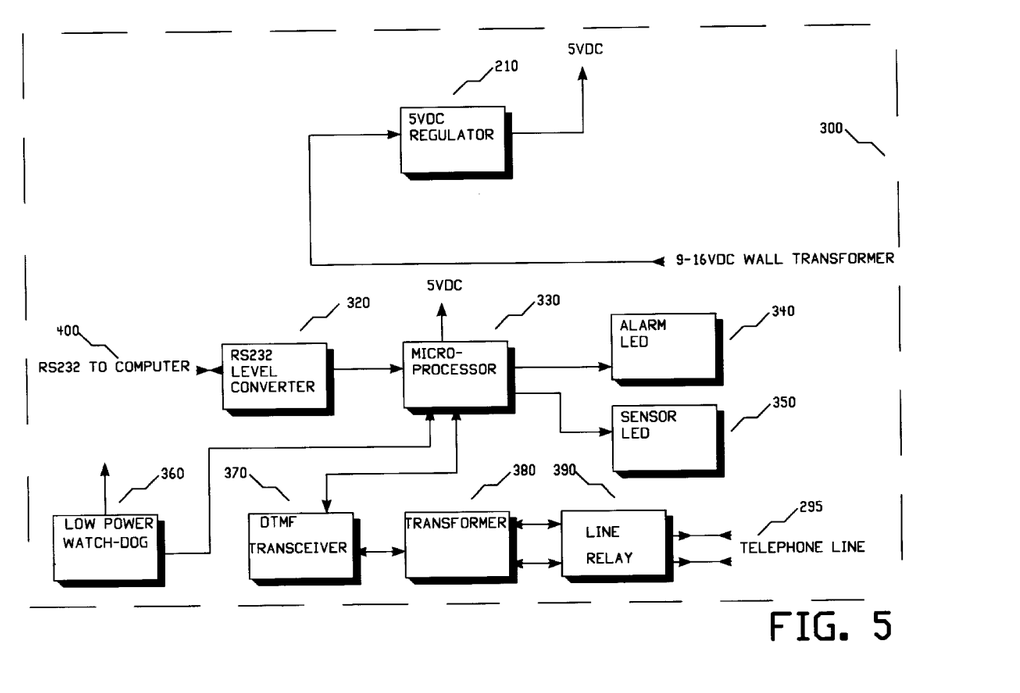
FIG. 5 is a block diagram of the monitoring and diagnostic computer interface device in accordance with the present invention.

The monitoring and diagnostic device is comprised of a computer and an interface device that connects the telephone line to the computer. The interface device 300, shown in FIG. 5, is connected to the microprocessor device 200 by telephone line 295 and is connected through an RS232 connector 400 to the computer. As further shown in FIG. 5, said interface device 300 contains a voltage regulator 310, an RS232 level converter circuit 320, a microprocessor circuit 330, a DTNE transceiver 370, a low power watchdog circuit 360, an isolation transformer 380 for connection to the phone line, an alarm LED 340, a sensor LED 350 and a line relay 390. The interface device 300 is powered by an AC to low voltage DC wall transformer which supplies power to the interface device 300. The interface device 300 is connected to the user's telephone line 295. Said volt regulator 310 is provided to deliver regulated DC voltage to said interface device 300 components. Said microprocessor circuit 330 controls and monitors all functions within the interface device 300 and further provides a means to transmit data back to a microprocessor device. The microprocessor circuit 330 contains an internal EEPROM that contains the software and a database of information on all the microprocessor devices it is tasked to track. To support the microprocessor circuit 330 is said low power watchdog circuit 360 that allows the microprocessor circuit 330 to reset when there is a brown out or power failure. The watchdog circuit 360 also provides a clean power-up start condition for the microprocessor device 300. The telephone line is connected to the interface device via a standard modular type phone plug. The microprocessor device 300 will electrically appear as an ordinary telephone extension. The alarm LED 340 and sensor LED 350 provide audio and visual alarms to the computer operator of microprocessor devices reporting unusual conditions. The DTWF transceiver 370 takes audio from the phone line, amplifies it and squares it off to produce pulses that are, in turn, fed to the interface circuit 330, counted and compared to stored values.

The monitoring and diagnostic device is located at a remote location where it is desired to collect the data from a plurality of sensor devices and microprocessor devices located at user locations. The monitoring and diagnostic device maintains all data and provides all updates to the user microprocessor devices. The monitoring and diagnostic device contains the master clock that is used to reset the remote microprocessor devices. The microprocessor device calls the computer on a calculated call back time received from the monitoring and diagnostic device during the prior call. When a call in occurs, the microprocessor device's clock is updated, and its data downloaded. While connected, the monitoring and diagnostic device calculates the fuel consumption, compares it to the fuel delivery information entered when fuel was last delivered to the user's location and calculates when the microprocessor device should call again. The monitoring and diagnostic device tracks microprocessor device information and alerts the operator that a microprocessor device has not reported on schedule and a service call is made if required. Data is exchanged between the computer and the interface device by an RS232 asynchronous serial port. This port is used for the computer to talk with the interface device to exchange data. The function of the interface device is to translate the RS232 data from the computer into and from DTME signals used over the telephone line to communicate with a plurality of microprocessor devices in the field. The interface device contains the software and a database of information on all the microprocessor devices it is tasked to track. In oil burner operation, the user enters the electronic serial number of each microprocessor device, the client's name, phone number, fuel tank size, fuel flow nozzle size, the lowest fuel level to allow, the last date tank was filled, how many gallons taken on during the last fill and any other pertinent information needed. When data is received from a microprocessor device, the interface device signals the computer a call is coming in. The computer signals the interface device to electronically answer the telephone and send the go ahead signal. The interface device then converts the DTMF data it receives over the telephone to ASCII data understood by the computer. The computer software then reads the electronic serial number of the microprocessor device, looks it up in the computer's database, and tells the microprocessor devices (via the "interface device") to send all its data. The microprocessor device then sends all the contents of its EEPROM along with a checksum. The checksum is calculated prior to being sent and is calculated in the monitoring and diagnostic device and compared with the checksum from the microprocessor device. If there is a difference in the checksum sent by the microprocessor device and the checksum calculated by the monitoring and diagnostic device, the microprocessor device's EEPROM contents are resent until either correct checksum is received or a timeout period is reached. If the timeout is reached first, both the microprocessor device and the interface device will hang up the telephone lines and try again later. After the reading of the microprocessor device data is accomplished, and while still connected to the telephone line, the monitoring and diagnostic device will calculate the fuel consumption per minute of run time and per minute of actual calendar time. This is done in the monitoring and diagnostic device's computer by adding all the run times stored in the database since the tank was last filled, taking the average burn rate in gallons per minute as calculated from the last fill up, making an adjustment based on the time between the last fill up and the time the microprocessor device called in, then calculating how much fuel has just been used since the last reading and storing the data. The computer then estimates when the tank will reach its minimum level and saves this for a printout to the user. The computer then calculates a new call back time so tell the microprocessor device when would be the best time to call back. The call back time is optimized by the computer based on how fast fuel is currently being consumed and how much fuel is estimated to remain in the tank. The computer then sends a command through the interface device to reset all data and to hang up the phone. The computer also provides an operator with both audio and visual warnings of a microprocessor device site in need of immediate attention. Further, the computer keeps track of when each microprocessor device is to call back and generates a warning if the call back is seriously overdue.

Similarly, in refrigeration or air conditioning applications, the amount of time the compressor motor runs, and the amounts of time it is shut off are stored into the microprocessor device memory and these average values are transmitted in the same manner as in heating applications. The microprocessor device is programmed with maximum values. When the cycle time or duty cycle exceeds the programmed value, the microprocessor device initiates a call to the monitoring and diagnostic device's computer via the interface device. The monitoring and diagnostic device's computer analyzes the change in a duty cycle as determined from previous data stored in the database and alerts the computer operator with a warning tone and visual message on the central monitoring computer display. The operator may then change the programmed value from the computer and cause the microprocessor device to report back once this new value is reached. Thus the rate of failure can be detected and the software can predict when the refrigeration or air conditioning unit is likely to fail in a more catastrophic manner. This allows a service technician to service a refrigeration unit before it fails completely and usually without having to empty the refrigerated items.

The preferred embodiments of the present invention disclosed herein have been discussed for the purpose of familiarizing the reader with the novel aspects of the invention. Although preferred embodiments of this invention have been shown, many changes, modifications, and substitutions may be made by one having ordinary skill in the art without departing from the scope and spirit of the invention as described in the following claims.

What is claimed is:

1. A monitor and diagnostic apparatus for an oil burner motor, with said oil burner motor having a measurable electrical field, said oil burner motor having an operational history comprising a sequence of on/off cycles and performance events within each on/off cycle, said apparatus comprising:

an inductive sensor device having a sensor coil for providing a signal corresponding to the presence of an electromagnetic field of said oil burner motor when said oil burner motor is operating;

a microprocessor device for processing said signal from said sensor device, said microprocessor device providing an output of at least one performance signal;

a central monitoring and diagnostic device for processing said performance signal from said microprocessor device, wherein said monitoring and diagnostic device determines the fuel consumption per minute of run time and per minute of actual calendar time and then estimates when the tank will reach its minimum level.

2. The monitor and diagnostic apparatus of claim 1 wherein said sensor device is connected to said oil burner motor by mechanical means, and further said sensor device has no electrical connection to said oil burner motor.

3. The monitor and diagnostic apparatus of claim 2 wherein said microprocessor device provides an output of at least one performance signal corresponding to the entire time the motor is running as stored in the lapsed time storage registers of said oil burner motor over a pre-selected time interval.

4. The monitor and diagnostic apparatus of claim 3 wherein said microprocessor device further provides a means to detect a "lock out" condition by reporting conditions where the oil burner motor being monitored turns on and then off in a short period by comparing a "short run" value with each and every run time.

5. The monitor and diagnostic apparatus of claim 4 wherein said central monitoring and diagnostic device determines the fuel used during the pre-selected time interval and the total fuel remaining in the fuel supply tank for said oil burner motor to diagnose the operational history of said oil burner.

6. The monitor and diagnostic apparatus of claim 5 wherein said central monitoring and diagnostic device comprises an interface device and a computer.

7. A monitor and diagnostic apparatus for a refrigeration compressor motor, with said refrigeration compressor motor having a measurable electrical field, said motor having an operational history comprising a sequence of on/off cycles and performance events within each on/off cycle, said apparatus comprising:

an inductive sensor device having a sensor coil for providing a signal corresponding to the presence of an electromagnetic field of said refrigeration compressor motor when said motor is operating;

a microprocessor device for processing said signal from said sensor device, said microprocessor device providing an output of at least one performance signal;

a central monitoring and diagnostic device for processing said performance signal from said microprocessor device, wherein said monitoring and diagnostic device determines the amount of time said refrigeration compressor motor runs and the amount of time said refrigeration compressor motor is shut off.

8. The monitor and diagnostic apparatus of claim 7 wherein said sensor device is connected to said refrigeration compressor motor by mechanical means, and further said sensor device has no electrical connection to said refrigeration compressor motor.

9. The monitor and diagnostic apparatus of claim 8 wherein said microprocessor device provides an output of at least one performance signal corresponding to the amount of time said refrigeration compressor motor runs and the amount of time said refrigeration compressor motor is shut off over a pre-selected time interval.

10. The monitor and diagnostic apparatus of claim 9 wherein said central monitoring and diagnostic device determines the actual running time of said refrigeration compressor motor during the pre-selected time interval and analyzing the change in a duty cycle as determined from previous data stored in a database to predict potential failure of the refrigeration compressor motor.

11. The monitor and diagnostic apparatus of claim 10 wherein said central monitoring and diagnostic device comprises an interface device and a computer.

* * * * *